(12) United States Patent
Sato

(10) Patent No.: US 8,754,624 B2
(45) Date of Patent: Jun. 17, 2014

(54) DC/DC CONVERTER AND ELECTRONIC APPARATUS

(75) Inventor: Takashi Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 13/160,364

(22) Filed: Jun. 14, 2011

(65) Prior Publication Data

US 2012/0001611 A1 Jan. 5, 2012

(30) Foreign Application Priority Data

Jul. 1, 2010 (JP) ................................ 2010-151432

(51) Int. Cl.
*G05F 1/00* (2006.01)
(52) U.S. Cl.
USPC ........................ 323/285; 323/281; 323/907
(58) Field of Classification Search
CPC . H02M 1/32; H02M 3/158; H02M 2001/327; H02M 2001/0009
USPC ......... 323/222–226, 266, 269, 270, 274, 907, 323/281–285
See application file for complete search history.

(56) References Cited

U.S. PATENT DOCUMENTS

| | | | |
|---|---|---|---|
| 5,343,034 A | | 8/1994 | Sato |
| 5,373,141 A * | | 12/1994 | Ko .................. 219/497 |
| 5,792,279 A | | 8/1998 | Tsuboi et al. |
| 5,923,542 A * | | 7/1999 | Sasaki et al. .................... 363/16 |
| 5,986,241 A * | | 11/1999 | Funahashi ..................... 219/497 |
| 6,208,528 B1 * | | 3/2001 | Soto et al. ......................... 363/15 |
| 7,215,106 B2 | | 5/2007 | Sato |
| 7,274,174 B2 * | | 9/2007 | Wang et al. .................... 323/224 |
| 7,383,145 B2 * | | 6/2008 | Tabaian et al. ................ 702/106 |
| 7,453,239 B2 * | | 11/2008 | Suzuki .......................... 320/152 |
| 7,936,140 B2 * | | 5/2011 | Wei ............................... 318/432 |
| 8,159,204 B2 | | 4/2012 | Grant |
| 2010/0079127 A1 * | | 4/2010 | Grant ............................ 323/285 |
| 2010/0104313 A1 * | | 4/2010 | Kosaka et al. ................... 399/88 |
| 2011/0318039 A1 * | | 12/2011 | Watanabe ....................... 399/69 |

FOREIGN PATENT DOCUMENTS

| | | |
|---|---|---|
| CN | 101714818 A | 5/2010 |
| JP | 2002-142449 A | 5/2002 |
| TW | I259273 B | 8/2006 |

OTHER PUBLICATIONS

Chinese Office Action dated Jul. 26, 2013 issued in corresponding Chinese Patent Application No. 201110185074.3.

* cited by examiner

*Primary Examiner* — Timothy J Dole
*Assistant Examiner* — Yusef Ahmed
(74) *Attorney, Agent, or Firm* — Fitzpatrick, Cella, Harper & Scinto

(57) ABSTRACT

A voltage converter includes a switching element, a control unit and a generation unit. The switching element controls an output voltage of the voltage converter. The control unit is configured to control the switching element based on a voltage signal. The generation unit is configured to generate the voltage signal by serially connecting a resistance element and one or more detection units having a resistor corresponding to a temperature and dividing a reference voltage by the detection units and the resistance element. The generation unit is arranged so as to be able to detect temperature change of a plurality of components which is overheat-protected.

15 Claims, 6 Drawing Sheets

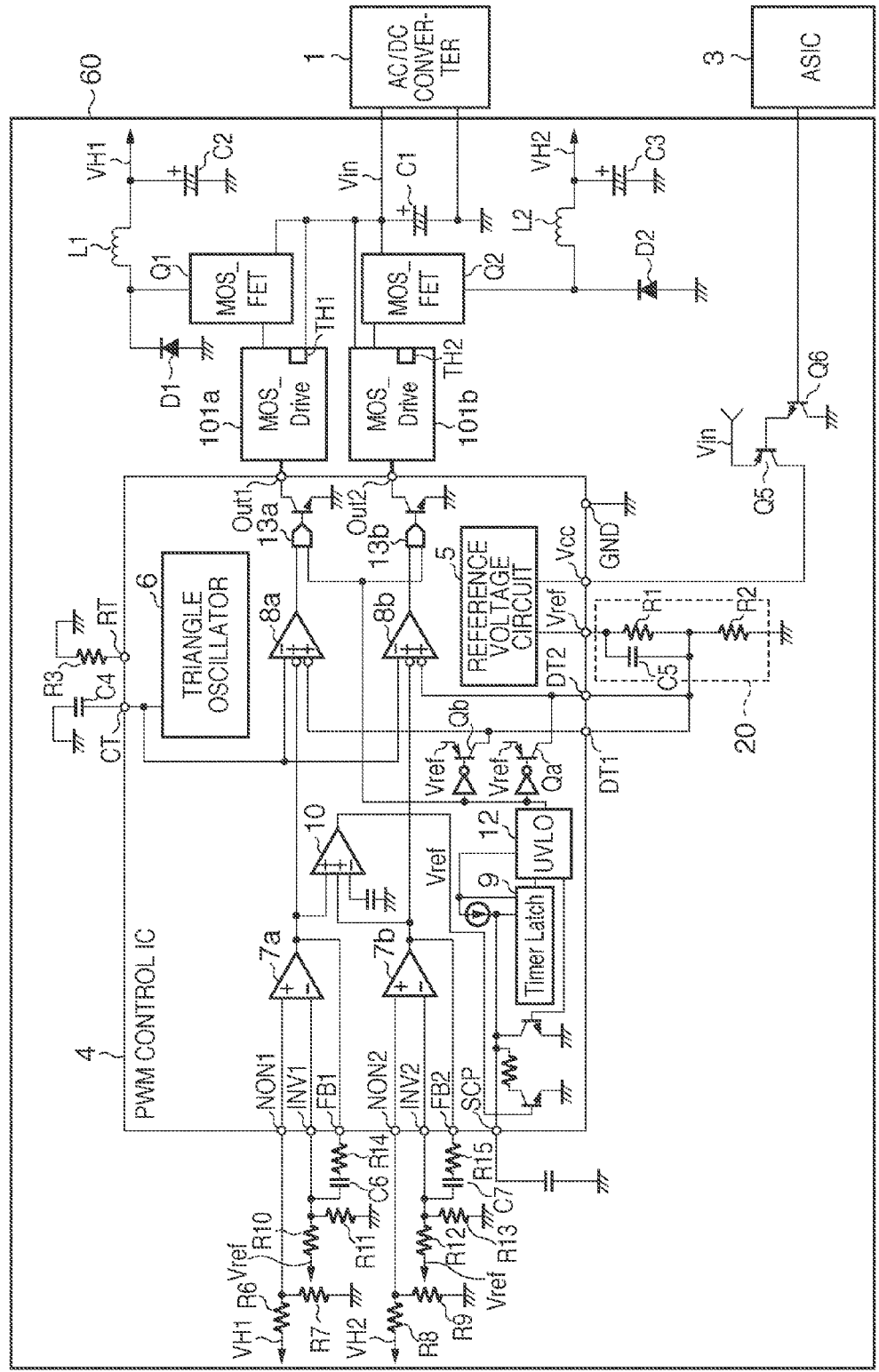
F I G. 5

DC/DC CONVERTER AND ELECTRONIC APPARATUS

BACKGROUND OF THE INVENTION

1. Field of the Invention

The present invention relates to a DC/DC converter and electronic apparatus.

2. Description of the Related Art

A DC/DC converter for converting a DC voltage of a predetermined voltage value into that of another voltage value is known. The DC/DC converter controls an output voltage to be constant by, for example, ON/OFF-controlling a switching element. Such DC/DC converter includes, for example, an overheat protection function for protecting the switching element from an abnormal overheat state.

As a related technique for protecting a switching element from an abnormal overheat state, Japanese Patent Laid-Open No. 2002-142449 refers to an overheat protection circuit having a PTC (Positive Temperature Coefficient) thermistor. With this technique, for example, the PTC thermistor (overheat detection element) is thermally coupled to the switching element via, for example, a silicon resin RS. When the PTC thermistor exceeds a Curie temperature, the resistance value of the thermistor increases, and the switching element is consequently turned off. Then, the switching element is protected from an overheat state.

However, in the technique disclosed in Japanese Patent Laid-Open No. 2002-142449, when a component other than the switching element is to be overheat-protected, an overheat detection element and protection circuit for stopping the switching operation of the switching element have to be newly added. For this reason, many components have to be added, resulting in an increase in cost.

SUMMARY OF THE INVENTION

The present invention provides a technique that allows another PTC thermistor to be added by a simple arrangement, and can detect an overheating of a component, allowing it to be protected from overheating in a cost-suppressed state.

According to a first aspect of the present invention there is provided a DC/DC converter comprising: a switching element; a driving unit configured to turn on/off the switching element based on a pulse width of a control signal; a control unit configured to generate the control signal based on a voltage signal; and a generation unit configured to generate the voltage signal by connecting a detection unit having a resistor corresponding to a temperature and a resistance element in series, and dividing a reference voltage by the detection unit and the resistance element.

According to a second aspect of the present invention there is provided an electronic apparatus comprising the above described DC/DC converter.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a schematic circuit diagram showing an example of the arrangement of a conventional DC/DC converter 60;

DESCRIPTION OF THE EMBODIMENTS

Figure 1:
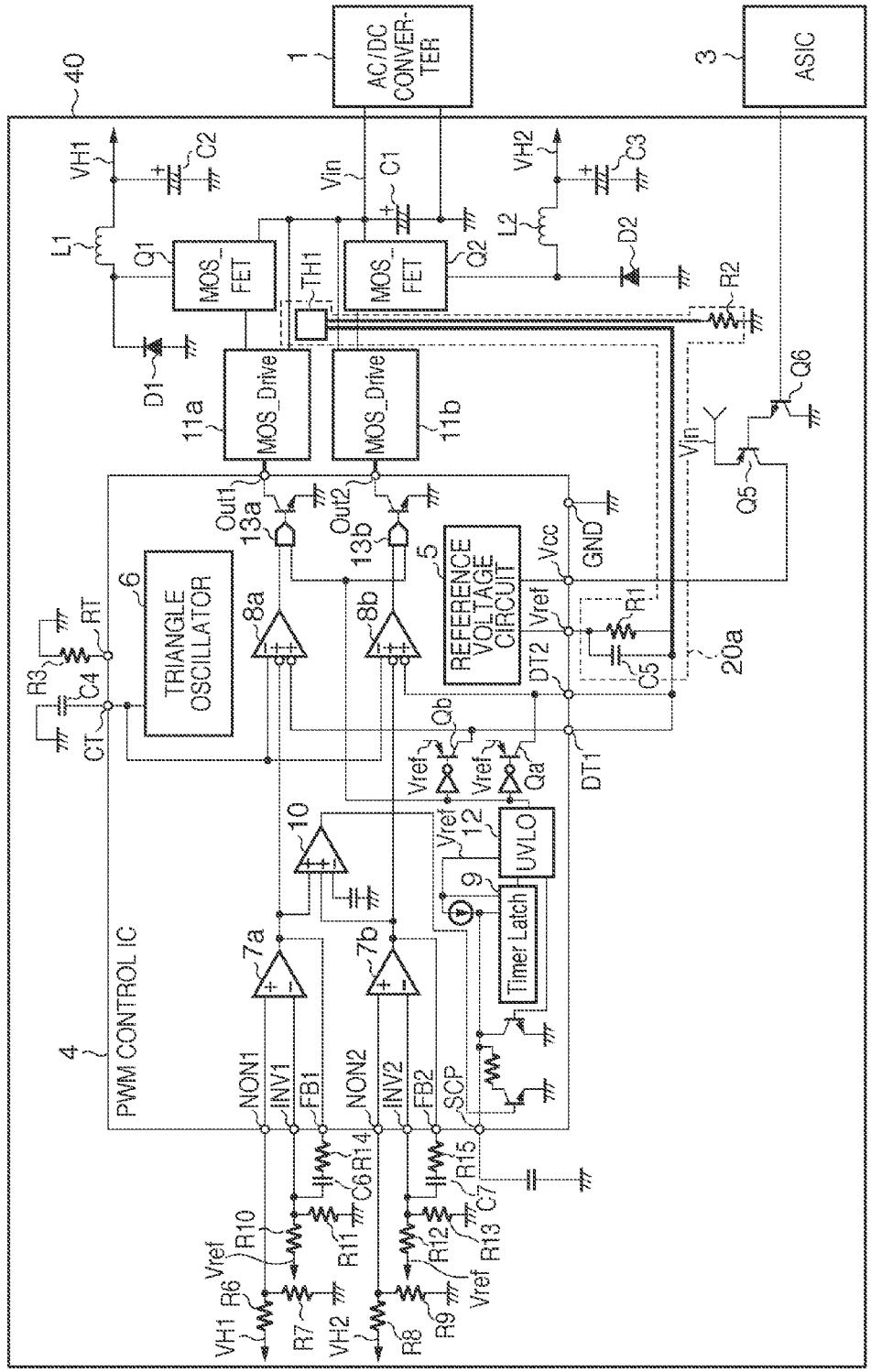
FIG. 1 is a schematic circuit diagram showing an example of the arrangement of a DC/DC converter 40 according to an embodiment of the present invention.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Prior to a description of a DC/DC converter according to this embodiment, a DC/DC converter which has basically the same arrangement except for connection positions of overheat detection elements will be described below as a comparative example of the DC/DC converter according to this embodiment.

A DC/DC converter including an overheat protection function will be described below with reference to FIG. 5. FIG. 5 shows a schematic arrangement of a 2-output DC/DC converter. Note that a DC/DC converter 60 shown in FIG. 5 is a step-down DC/DC converter using a PWM control IC.

A MOS-Drive circuit 101a includes an overheat detection element (PTC thermistor) TH1, which is thermally coupled to a MOS-FET Q1 as a switching element, so as to protect the MOS-FET Q1 from overheating. A MOS-Drive circuit 101b includes an overheat detection element (PTC thermistor) TH2, which is thermally coupled to a MOS-FET Q2 as a switching element, so as to protect the MOS-FET Q2 from overheating. Note that the MOS-FETs Q1 and Q2 and the PTC thermistors TH1 and TH2 are thermally coupled by arranging, for example, copper foil patterns of a printed circuit board at neighboring positions to be separated by a given isolation distance. Alternatively, these components may be thermally coupled using a silicone resin or silicone sheet having thermal conductivity excellent in heat resistance and electric insulation. That is, each overheat detection element is arranged in the vicinity of a component to be overheat-protected.

In this case, a PWM control IC 4 performs general 2-output PWM control. The PWM control IC 4 outputs a PWM (Pulse Width Modulation) signal to each switching element to ON/OFF-control the switching element. Output terminals (Out1 and Out2 terminals) of the PWM control IC 4 have an open-collector arrangement. The PWM control IC 4 is connected to control terminals of the MOS-FETs (switching elements) Q1 and Q2 via the MOS-Drive circuits 101a and 101b. The MOS-FETs Q1 and Q2 are ON/OFF-controlled by the PWM control of the PWM control IC 4. Thus, output voltages from the DC/DC converter 60 are controlled to be constant.

A maximum ON duty of the PWM signal is decided by electric potentials of DT1 and DT2 terminals. A voltage generation circuit 20 generates these electric potentials. This voltage generation circuit 20 is configured by resistors R1 and R2 and a capacitor C5. A parallel circuit of the resistor R1 and capacitor C5 is connected between a Vref terminal which outputs a reference voltage Vref and the DT1 and DT2 terminals. Also, the resistor R2 is connected between the DT1 and DT2 terminals and GND.

An electric potential at the DT terminal is decided by:

$$VDT = Vref \times R2/(R1+R2)$$

The capacitor C5 connected to the DT1 and DT2 terminals is arranged to soft-start the PWM control IC (soft-start function). A transient voltage VDT(t) at an activation timing of the PWM control IC 4 is given by:

$$VDT(t) = \frac{R2}{R1+R2} \times Vref + \frac{R1}{R1+R2} \times Vref \times \exp\left(-\frac{t}{C5 \times R}\right)$$

$$* R = \frac{R1 \times R2}{R1+R2}$$

Then, a soft-start activation time can be set.

An example of a schematic arrangement of the MOS-Drive circuit 101b shown in FIG. 5 will be described below with reference to FIG. 6.

The MOS-Drive circuit 101b is configured to include an npn transistor Q3, a pnp transistor Q4, resistors R16 and R17, and the PTC thermistor TH2.

The Out2 terminal of the PWM control IC 4 has an open-collector arrangement, and when an output transistor of the Out2 terminal is OFF, the transistor Q3 is enabled. In this case, a gate-source potential of the MOS-FET Q2 is equal to or lower than a threshold potential, and the MOS-FET Q2 is disabled. When the output transistor of the Out2 terminal is turned on, the transistor Q4 is turned on, and the gate-source potential of the MOS-FET Q2 assumes a value given by:

$$Vgs = Vin \times \left(\frac{Rth01 + R17}{R16 + R17 + Rth01}\right)$$

where Rth01 is a resistance value of the PTC thermistor TH2 at the Curie temperature or lower.

When this value is set to be equal to higher than the gate-source threshold potential, the MOS-FET Q2 is enabled. In this manner, the output transistor of the PWM control IC 4 is ON/OFF-controlled to control the output voltages of the DC/DC converter to have constant voltage values.

When the MOS-FET Q2 keeps flowing an excessive load current due to a trouble of the load side to which the DC/DC converter supplies a voltage, a loss of the MOS-FET Q2 becomes greater. For this reason, a heat generation amount of the MOS-FET Q2 abruptly increases, and is often damaged. Also, due to short-circuiting or open abnormality of circuit components or patterns of the DC/DC converter, a gate bias of the MOS-FET Q2 is not sufficiently applied. For this reason, a state in which an ON resistance of the MOS-FET Q2 is sufficiently low is not set, and a switching operation is made. In this case as well, the MOS-FET Q2 may be similarly damaged. The same applies to the MOS-FET Q1 shown in FIG. 5.

For this reason, in order to avoid the MOS-FET Q2 in an overheat state from being damaged by heating, the MOS-Drive circuit 101b includes the PTC thermistor TH2 which is thermally coupled to the MOS-FET Q2. Likewise, the MOS-Drive circuit 101a includes the PTC thermistor TH1 which is thermally coupled to the MOS-FET Q1.

Figure 7:
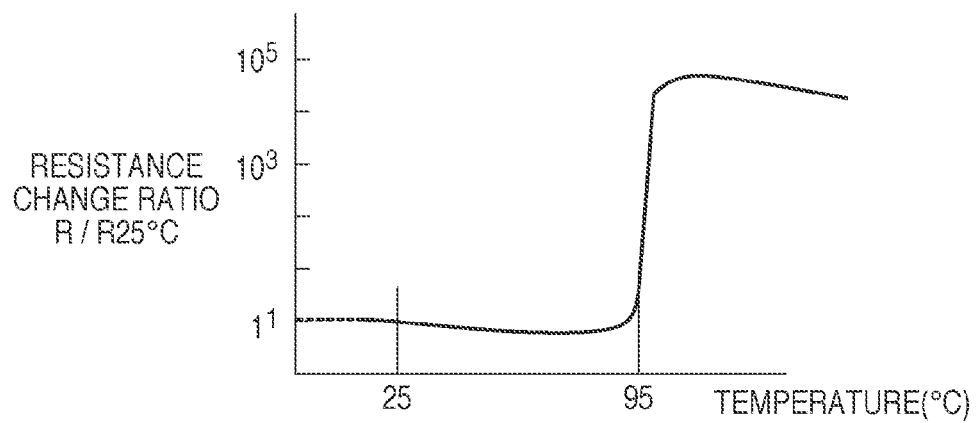
FIG. 7 is a graph showing an example of resistance-temperature characteristics of a PTC thermistor TH.

The resistance-temperature characteristics of a PTC thermistor will be explained below with reference to FIG. 7. The PTC thermistor has characteristics in which when the temperature rises, a resistance value of the thermistor abruptly increases to have the Curie temperature as a boundary. In the characteristics shown in FIG. 7, a temperature of about 95° C. corresponds to the Curie temperature.

Figure 6:
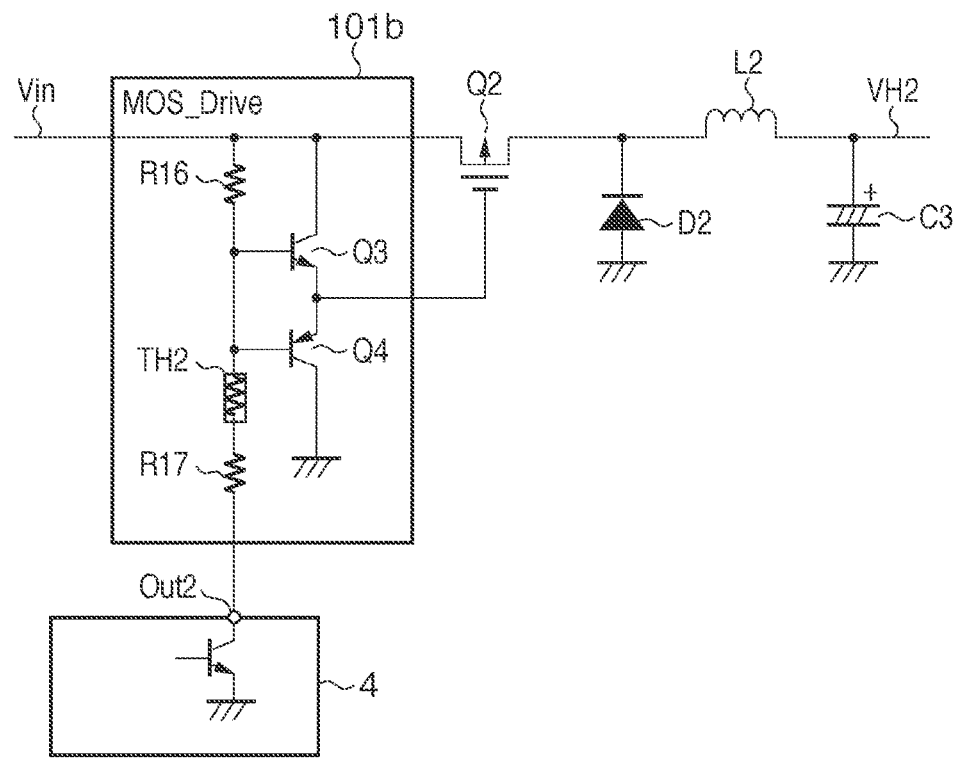
FIG. 6 is a schematic circuit diagram showing an example of the arrangement of a MOS-Drive circuit 101b.

When the PTC thermistor TH2 thermally coupled to the MOS-FET Q2 shown in FIG. 6 exceeds the Curie temperature, the resistance value of the PTC thermistor TH2 abruptly increases. For this reason, the gate-source potential of the MOS-FET Q2 becomes equal to or lower than the threshold potential. Hence, even when the transistor of the Out2 terminal is turned on, the gate-source potential of the MOS-FET Q2 cannot be sufficiently biased, and the output voltage can be suppressed to a voltage level lower than a target voltage.

In this case, output voltage of error amplifier 7b changes to broaden duties. However, since the resistance value of the PTC thermistor TH2 increases, the gate-source potential of the MOS-FET Q2 cannot apply a bias equal to or higher than the threshold voltage, and the MOS-FET Q2 cannot be enabled. For this reason, the output voltage of the error amplifier 7b is decreased and saturated.

When the output from the error amplifier 7b is saturated, and a state equal or lower than an electric potential set by an SCP comparator 10 continues for a time period or more which is set by an SCP terminal, the operations of the MOS-FETs Q1 and Q2 are stopped via a UVLO circuit 12. At the same time, since the UVLO circuit 12 can also stop PWM comparators 8a and 8b, it shutdown-protects the DC/DC converter.

In the aforementioned arrangement shown in FIGS. 5 and 6, each PTC thermistor which is connected to the control terminal of the switching element (MOS-FET) detects an abnormal overheat of the switching element, and stops the switching operation of the DC/DC converter. In this case, in implementation on a printed circuit board, the transistors and MOS-FETs as main switches of the DC/DC converter can be easily thermally coupled to the PTC thermistors.

Conversely, it becomes difficult to thermally couple the PTC thermistors to other components. For this reason, it is difficult to stop the operation of the DC/DC converter by detecting overheat states of flywheel diodes D1 and D2 and coils L1 and L2 used in the DC/DC converter and elements (components) mounted on the printed circuit board.

For example, in a DC/DC converter, the output voltage of which can be changed by a control signal from an ASIC 3 which controls an apparatus (not shown), an ON duty ratio changes depending on the relationship between input and output voltages. For this reason, in such DC/DC converter, the transistors and MOS-FETs as switching elements do not always reach an excessive temperature rise state. For example, in a DC/DC converter in which an input voltage Vin is 32 V, and an output voltage can be changed from 10 V to 20 V, an ON duty changes from 31.25% to 62.5%. When the output voltage is 10 V, the ON duty of the switching elements is low, and that of the flywheel diodes becomes high. When a load current increases in such operation state, losses of the flywheel diodes greatly increase, and their heat generation amounts increase abruptly. Hence, the flywheel diodes are damaged with higher possibility than the switching elements.

When the output terminals of the PWM control IC 4 have the open-collector arrangement with a lower drive performance, the MOS-Drive circuits 101a and 101b for quickly charging and discharging the gate capacitances of the MOS-FETs are required. In this case, when, for example, an overheat detection element is simply connected to the control terminal of each switching element, as described in Japanese Patent Laid-Open No. 2002-142449 above, the charging/discharging speed of a parasitic capacitance at the gate terminal of each MOS-FET lowers, resulting in an increase in switching loss and poor efficiency. Also, each PTC thermistor suffers resistance variations of ±10% to 20%, which are larger than those of ±5% of a normal resistor. Hence, it becomes difficult to manage the charging/discharging speed of the gate capacitance.

(First Embodiment)

An example of a schematic arrangement of a DC/DC converter according to an embodiment of the present invention, which improves the aforementioned DC/DC converter, will be described below with reference to FIG. 1. Note that this embodiment will exemplify a 2-output DC/DC converter. However, the present invention is not limited by the 2-output DC/DC converter, but it is applicable to a 1- or 3-output DC/DC converter.

A DC/DC converter 40 assumes a role of converting, based on an input voltage of a predetermined voltage value, the input voltage into an output voltage of another voltage value. In this embodiment, the DC/DC converter 40 is a step-down DC/DC converter using a PWM control IC. Note that the present invention is also applicable to a step-up DC/DC converter.

The DC/DC converter 40 generates predetermined voltages VH1 and VH2 from a voltage source (DC input voltage) Vin generated by an AC/DC converter 1. This embodiment will exemplify a case in which the input voltage Vin is 32 V, and both the output voltages VH1 and VH2 are 20 V.

A PWM control IC 4 performs general 2-output PWM (Pulse Width Modulation) control. Output terminals (Out1 and Out2 terminals) of the PWM control IC 4 have an open-collector arrangement. The PWM control IC 4 is connected to control terminals of MOS-FETs (switching elements) Q1 and Q2 via MOS-Drive circuits 11a and 11b. The MOS-Drive circuits 11a and 11b assume a role of enhancing the driving performances of the control terminals of the MOS-FETs Q1 and Q2. To additionally describe this, rectification circuits and smoothing circuits are connected to the output sides of the MOS-FETs Q1 and Q2. To the MOS-FET Q1, a coil L1 and capacitor C2 are connected as the smoothing circuit. This smoothing circuit generates the voltage VH1. To the MOS-FET Q1, a diode D1 is connected as the rectification circuit. Also, to the MOS-FET Q2, the smoothing circuit including a coil L2 and capacitor C3 is connected to generate the voltage VH2. To the MOS-FET Q2, a diode D2 is connected as the rectification circuit.

The PWM control IC 4 includes a reference voltage circuit 5, triangle oscillator 6, error amplifiers 7a and 7b, PWM comparators 8a and 8b, timer-latch type short circuit protection circuit 9, and SCP comparator 10. The PWM control IC 4 includes these circuits for two outputs. Note that these circuits are incorporated in a general 2-output PWM control IC. For example, TL1451 of TI (Texas Instrument), and BA9743AFV of ROHM provide a PWM control IC for a DC/DC converter incorporating the aforementioned functions.

The arrangement of the respective units of the PWM control IC 4 will be described below.

The reference voltage circuit 5 assumes a role as a reference voltage source inside the PWM control IC 4, and generates a reference voltage Vref (for example, 2.5 V) based on the voltage source Vin input from a Vcc terminal. Also, the reference voltage circuit 5 outputs the reference voltage Vref outside the PWM control IC 4 using a Vref terminal.

An ON/OFF switch is arranged between the Vcc terminal and voltage source Vin. The ON/OFF switch is configured by, for example, a pnp transistor Q5 and npn transistor Q6, and is controlled by a control signal (ENB signal) from an ASIC 3.

When the ENB signal goes to H level, the ON/OFF switch conducts a power supply voltage from the voltage source Vin. As a result, the power supply voltage from the voltage source Vin is supplied to the Vcc terminal to activate the PWM control IC 4. When the ENB signal is at L level, the power supply voltage from the voltage source Vin is not supplied to the Vcc terminal, thus stopping the operation of the PWM control IC 4.

The triangle oscillator 6 connects external components at CT and RT terminals, and generates a triangular wave toward the CT terminal. The CT terminal is used to externally connect a timing capacitor, and the RT terminal is used to externally connect a timing resistor. The triangle oscillator 6 generates a triangular wave to be input to inverting terminals of the PWM comparators 8a and 8b.

The triangle oscillator 6 charges/discharges the timing capacitor connected between the CT terminal and GND using a constant current circuit (not shown) inside the IC. This charging/discharging voltage is detected and reset by the PWM comparators 8a and 8b, thus obtaining a triangular wave. The resistor connected between the RT terminal and GND decides the constant current value for charging/discharging. Assume that the voltage value level of the triangular wave has an amplitude of 0.49 V within a range from 1.97 V to 1.48 V.

Each of the error amplifiers (ERR Amp) 7a and 7b receives a DC reference voltage at one of two input terminals INV (inverting input terminal) and NON (non-inverting terminal), and receives a voltage obtained by dividing the output voltage VH1 or VH2 by a resistor at the other terminal. The voltages at the two input terminals are controlled to have equal electric potentials since the voltage gain of the error amplifier 7a or 7b is sufficiently large. To which of the two input terminals the reference voltage is input is decided by a logic arrangement in the PWM control IC 4. In this case, the INV terminal is used as an input terminal on the reference voltage side. Note that the outputs of the error amplifiers 7a and 7b are connected to non-inverting terminals of the PWM comparators 8a and 8b. For this reason, the INV terminal receives a voltage obtained by dividing the reference voltage by a resistor, and the NON terminal receives a value obtained by dividing the output voltage by a resistor. Then, the MOS-FETs Q1 and Q2 are PWM-controlled to obtain constant output voltages.

Each of the PWM comparators (PWM Comp) 8a and 8b is a 3-input comparator, which has two non-inverting input terminals and one inverting input terminal. The inverting input terminals of the PWM comparators 8a and 8b receive the output (CT terminal) from the triangle oscillator 6, and the non-inverting input terminals receive error output voltages of the error amplifiers 7a and 7b, and voltages (dead-time control waveforms) from DT1 and DT2 terminals. The PWM comparator 8a compares the signal output from the triangle oscillator 6, that output from the error amplifier 7a, and that input from the DT1 terminal, and outputs a comparison result. Likewise, the PWM comparator 8b compares the signal output from the triangle oscillator 6, that output from the error amplifier 7b, and that input from the DT2 terminal, and outputs a comparison result. Furthermore, when the voltage of the signal output from the error amplifier 7a is lower than that of the signal input from the DT1 terminal, a PWM duty in the PWM comparator 8a is limited by the voltage of the signal input from the DT1 terminal. The same control applies to the PWM comparator 8b.

The outputs of the PWM comparators 8a and 8b are input to AND circuits 13a and 13b together with the output from a UVLO (Under Voltage Lock Out) circuit 12. Then, the outputs of the AND circuits 13a and 13b are individually input to control terminals (bases) of output transistors of the Out1 and Out2 terminals of the PWM control IC 4, respectively.

The output of the UVLO circuit 12 is input to the input terminals of the AND circuits 13a and 13b, which are connected to the Out1 and Out2 terminals. For this reason, the UVLO circuit 12 can simultaneously control (protect) both the Out1 and Out2 terminals.

The PWM comparators 8a and 8b compare the error output voltages from the error amplifiers 7a and 7b, and voltages (dead-time control waveforms) from the DT1 and DT2 terminals. When the voltage of the triangle wave is higher than the voltages from the error amplifiers 7a and 7b and the DT1 and DT2 terminals, the PWM comparators 8a and 8b enable the output transistors of the Out1 and Out2 terminals.

When the output voltages of the DC/DC converter 40 become abnormal due to, for example, short-circuiting, the timer-latch type short circuit protection circuit 9 forcibly disables the outputs to protect the respective units of the DC/DC converter 40. When output voltages lower, the error amplifiers 7a and 7b amplify errors, and the output voltages of the error amplifiers 7a and 7b lower. For this reason, the timer-latch type short circuit protection circuit 9 controls in a direction to increase a switching duty. That is, the conduction time periods of the output transistors of the Out1 and Out2 terminals are prolonged.

When one of voltages compared by the SCP comparator 10 is decreased to be lower than a threshold voltage (for example, 1.25 V), the timer-latch type short circuit protection circuit 9 detects that decrease via the UVLO circuit 12, and starts a short circuit protection function. An SCP (Short Circuit Protection) terminal assumes a role of masking this function for a predetermined period of time. The masking time period is set by a capacitor connected to the SCP terminal (for example, 6.36 ms by 0.01 μF).

That is, the timer-latch type short circuit protection circuit 9 starts the short circuit protection function when the output voltages of the error amplifiers 7a and 7b become equal to or lower than the threshold voltage over the time period set by the SCP terminal. When the short circuit protection function is started, the timer-latch type short circuit protection circuit 9 disables the transistors of the Out1 and Out2 terminals via the UVLO circuit 12, and enables transistors Qa and Qb, thus stopping the PWM comparators 8a and 8b.

The mask function of the SCP terminal effectively serves to avoid a trouble at an activation timing of the DC/DC converter. At the activation timing of the DC/DC converter 40, since the output voltages are 0 V, feedback voltages of the output voltages input to the error amplifiers 7a and 7b are lower than a target voltage. For this reason, the outputs of the error amplifiers 7a and 7b control to raise the output voltages (that is, the PWM control works to control at a duty of 100%). However, when the MOS-FETs Q1 and Q2 are controlled by the 100% PWM control, rush currents at the activation timing increase. In order to suppress such rush currents, the leading edges of the output voltages are controlled by gradually broadening the PWM duty. The mask function of the SCP terminal avoids the short circuit protection function from malfunctioning at the activation timing of the PWM control IC.

The DT1 and DT2 terminals assume a role of dead-time adjustment circuitries. The dead-time is set by dividing a Vref-GND potential by the resistor of a PTC thermistor TH in addition to resistors R1 (first resistor) and R2 (second resistor). The DT1 and DT2 terminals input voltages based on the reference voltage from the Vref terminal into the PWM control IC 4 as those which specify maximum ON duties upon execution of the PWM control. A voltage generation circuit 20a generates a voltage to be supplied to the DT1 and DT2 terminals. The voltage generation circuit 20a includes the resistors R1 and R2, a capacitor C5, and the thermistor TH1. That is, electric potentials of the DT1 and DT2 terminals serve to decide maximum ON duties of the PWM control IC 4, and are input to the non-inverting input terminals of the PWM comparators 8a and 8b. A parallel circuit of the resistor R1 and capacitor C5 is connected between the DT1 and DT2 terminals, and the Vref terminal. The resistor R2 and PTC thermistor TH are connected between the DT1 and DT2 terminals, and GND. The DT1 and DT2 terminals serve to gradually increase the PWM ON duties using a gradual increase in charging voltage of this capacitor C5, when the PWM control IC 4 is activated upon reception of an electric power supplied from the Vcc terminal.

The PTC thermistor TH serving as an overheat detection element will be described below. The PTC thermistor TH is thermally coupled to the MOS-FETs Q1 and Q2. More specifically, the PTC thermistor TH is arranged in the vicinity of components (MOS-FETs Q1 and Q2) to be overheat-protected (within predetermined ranges from the components). One terminal of the PTC thermistor TH is connected to the DT1 and DT2 terminals, and the other terminal is connected to one terminal of the resistor R2. Note that the other terminal of the resistor R2 is connected to GND.

Note that voltage settings and constant settings of the DT1 and DT2 terminals can be decided in consideration of a resistance value of the PTC thermistor TH at the Curie temperature or lower. Also, maximum ON duty settings and soft-start circuit settings can also be similarly decided.

Electric potential of the DT1 and DT2 terminals assume values given by:

$$VDT = Vref \times \frac{R2 + Rth01}{R1 + R2 + Rth01}$$

where Rth01 is the resistance value of the PTC thermistor TH at the Curie temperature or lower.

The electric potentials (maximum ON duties) of the DT1 and DT2 terminals are set to be values larger by 10% to 20% than a duty decided by an input-output voltage ratio in consideration of, for example, load variations and component variations.

A case will be described below wherein the MOS-FETs Q1 and Q2 to which the PTC thermistor TH is thermally coupled reach an overheat state.

Assume that one of the MOS-FETs Q1 and Q2 reaches an overheat state, and the PTC thermistor TH exceeds the Curie temperature. In this case, the resistance value of the PTC thermistor TH abruptly increases, and the electric potentials of the DT1 and DT2 terminals rise, and become higher than the error potential voltages of the error amplifiers 7a and 7b.

As a result, maximum ON duties of the outputs of the PWM comparators 8a and 8b are limited by the electric potentials of the DT1 and DT2 terminals, which become higher than the error voltages of the error amplifiers 7a and 7b. For this reason, the output voltages of the DC/DC converter 40 cannot maintain a target voltage. Then, in the PWM control IC 4, the output voltages of the error amplifiers 7a and 7b are controlled to be decreased, so as to broaden duties. In this case, the MOS-FETs Q1 and Q2 perform switching operations, which are duty-limited by the electric potentials of the DT1 and DT2 terminals, the outputs of the error amplifiers 7a and 7b are saturated, and become equal to or lower than the threshold potential set by the SCP comparator 10.

When the saturation of the error amplifiers 7a and 7b continues over the time period set by the SCP terminal, the switching operations of the MOS-FETs Q1 and Q2 are stopped via the UVLO circuit 12, thus stopping the PWM control operation (shutdown protection).

In this case, the first embodiment has exemplified the arrangement in which the PTC thermistor TH is thermally coupled to the MOS-FETs Q1 and Q2. However, the PTC thermistor TH is connected to the DT1 and DT2 terminals of the PWM control IC 4 in place of the control terminals of the MOS-FETs Q1 and Q2. For this reason, the PTC thermistor and MOS-FETs Q1 and Q2 need not always be thermally coupled. For example, the PTC thermistor TH may be thermally coupled to flywheel diodes to stop (protect) the switching operations of the DC/DC converter 40.

Note that the shutdown protection is canceled after an ON/OFF circuit connected to the input voltage Vin and the Vcc terminal of the PWM control IC 4 shuts off the voltage Vin once, and supplies the voltage Vin again.

As described above, according to the first embodiment, the PTC thermistor TH is connected to the DT terminals of the PWM control IC 4. Thus, since overheat states of a plurality of components can be detected by increasing only the number of PTC thermistors, the plurality of components can be overheat-protected while suppressing cost.

Since the PTC thermistor is not connected to the control terminal of each switching element, a plurality of components can be overheat-protected without increasing switching losses of the switching elements and causing any poor efficiency.

(Second Embodiment)

The second embodiment will be described below. FIG. 2 shows an example of a schematic arrangement of a DC/DC converter according to the second embodiment. Note that components denoted by the same reference numerals have the same functions as those of FIG. 1 used to explain the first embodiment, and a difference will be mainly explained below.

In this case, the difference from the arrangement of the first embodiment is that a second PTC thermistor TH2 is serially connected in addition to a first PTC thermistor TH1 in a voltage generation circuit 20b. The voltage generation circuit 20b includes resistors R1 and R2, a capacitor C5, and the thermistors TH1 and TH2. The first PTC thermistor TH1 is thermally coupled to MOS-FETs Q1 and Q2, and the second PTC thermistor TH2 is thermally coupled to a flywheel diode D2 arranged as a rectification circuit.

In place of a reference voltage Vref, which is input by dividing it by a resistor, an output voltage adjustment unit 31 is connected to inverting terminals of error amplifiers 7a and 7b. The output voltage adjustment unit 31 changes a voltage value of the reference voltage Vref. For this reason, a DC/DC converter 40 can change and output the output voltages.

The output voltage adjustment unit 31 includes an D/A (digital to analog) converter 31a. The D/A converter 31a receives the reference voltage Vref and a control signal from an ASIC 3 which controls an apparatus (not shown). For example, when an 8-bit D/A converter is used, the reference voltage Vref can be adjusted in $2^8$ levels (a maximum of 256 levels).

When the output voltages are configured to be changed in the DC/DC converter 40, ON duties decided by the input and output voltages are changed. For this reason, ON time periods of the MOS-FETs Q1 and Q2 and flywheel diode D2 change depending on output voltage settings. As a result, a loss ratio changes, and overheat states of components change depending on the output voltage settings.

As described above, according to the second embodiment, the plurality of PTC thermistors are connected in series, and are respectively thermally coupled to a plurality of components. Then, two or more components, which configure the DC/DC converter 40 can easily undergo overheat detection.

Note that the second embodiment has exemplified the case in which the second PTC thermistor TH2 is thermally coupled to the flywheel diode D2. However, the present invention is not limited to this. For example, a third PTC thermistor may be thermally coupled to coils L1 and L2 arranged as rectification circuits.

(Third Embodiment)

The third embodiment will be described below. FIG. 3 shows an example of a schematic arrangement of a DC/DC converter according to the third embodiment. Note that components denoted by the same reference numerals have the same functions as those of the components of FIG. 2 used to explain the second embodiment, and a difference will be mainly explained.

In this case, the difference from the arrangement of the second embodiment is that a switching unit 32 is arranged on a wiring line that connects DT1 and DT2 terminals and GND in a voltage generation circuit 20c. The voltage generation circuit 20c includes resistors R1 and R2, a capacitor C5, thermistors TH1 and TH2, and the switching unit 32. The switching unit 32 is arranged between the resistor R2 and the first and second PTC thermistors TH1 and TH2. The switching unit 32 selects one of the PTC thermistors, which are connected in series with the resistor R2, based on an instruction (control signal) from an ASIC 3.

The PTC thermistor as a switching destination is selected based on an external control signal (from, for example, the ASIC 3). The ASIC 3 controls switching of the switching unit 32 according to output voltages of a DC/DC converter 40, which are set by an output voltage adjustment unit 31.

A case will be examined below wherein, for example, an input voltage Vin is 32 V, and output voltages are to be changed from 10 V to 20 V. In this case, during an output period of voltages from 10 V to 15 V, the switching unit 32 connects the second PTC thermistor TH2, which is thermally coupled to a flywheel diode D2, to the resistor R2, thus performing overheat detection of the flywheel diode D2. When voltages exceeding 15 V are output, the switching unit 32 connects the first PTC thermistor TH1, which is thermally coupled to MOS-FETs Q1 and Q2, to the resistor R2, thus performing overheat detection of the MOS-FETs Q1 and Q2.

As described above, according to the third embodiment, a component to be overheat-protected is selected based on ON duties decided based on the output and input voltages, thus performing overheat protection of that component.

(Fourth Embodiment)

The fourth embodiment will be described below. The fourth embodiment will explain a case in which the DC/DC converter 40 shown in FIG. 3 used to explain the third embodiment is built in an electronic apparatus. Note that an ink-jet printing apparatus will be exemplified as the electronic apparatus.

Figure 3:
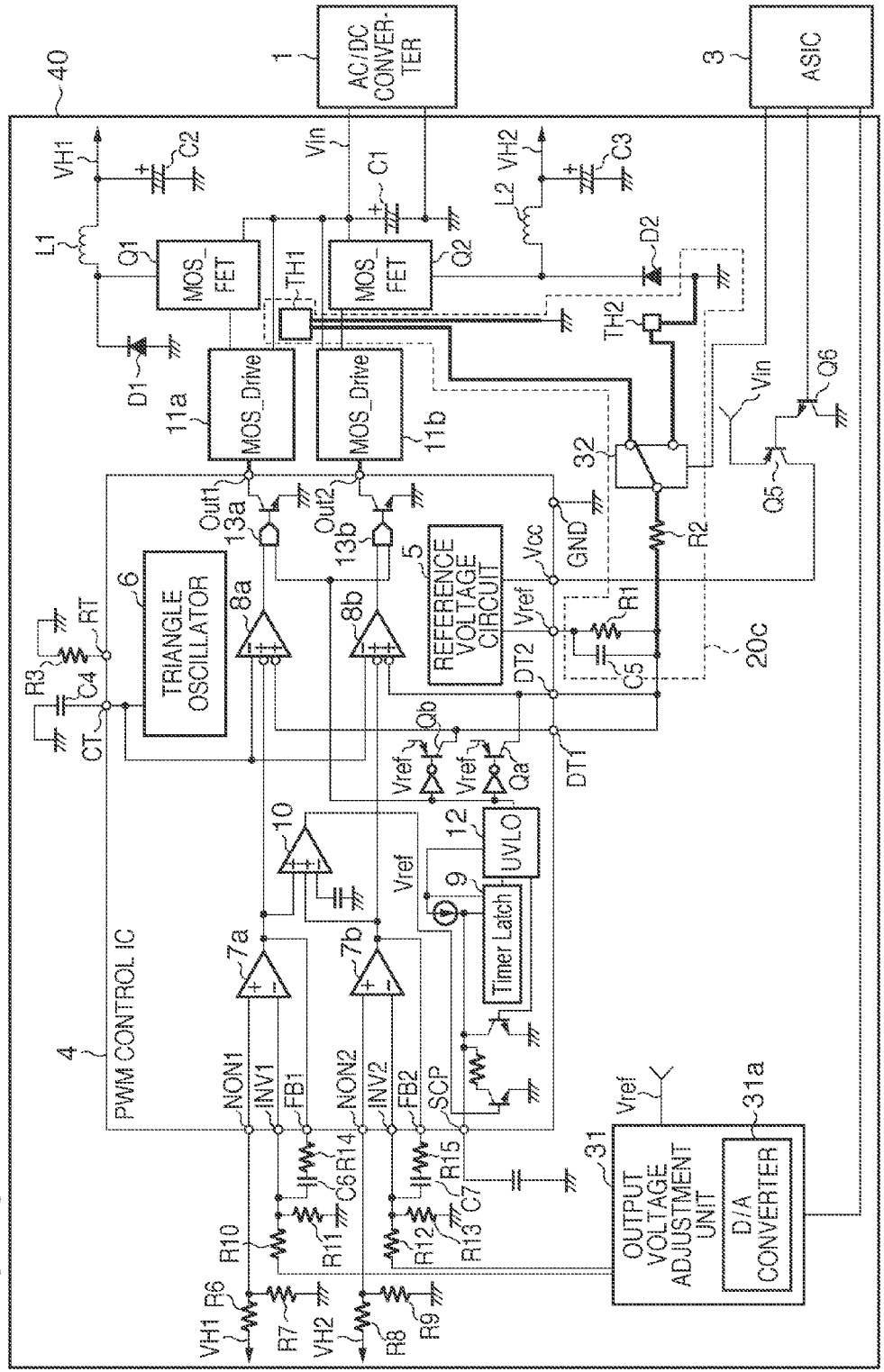
FIG. 3 is a schematic circuit diagram showing an example of the arrangement of a DC/DC converter 40 according to the third embodiment.
Figure 4:
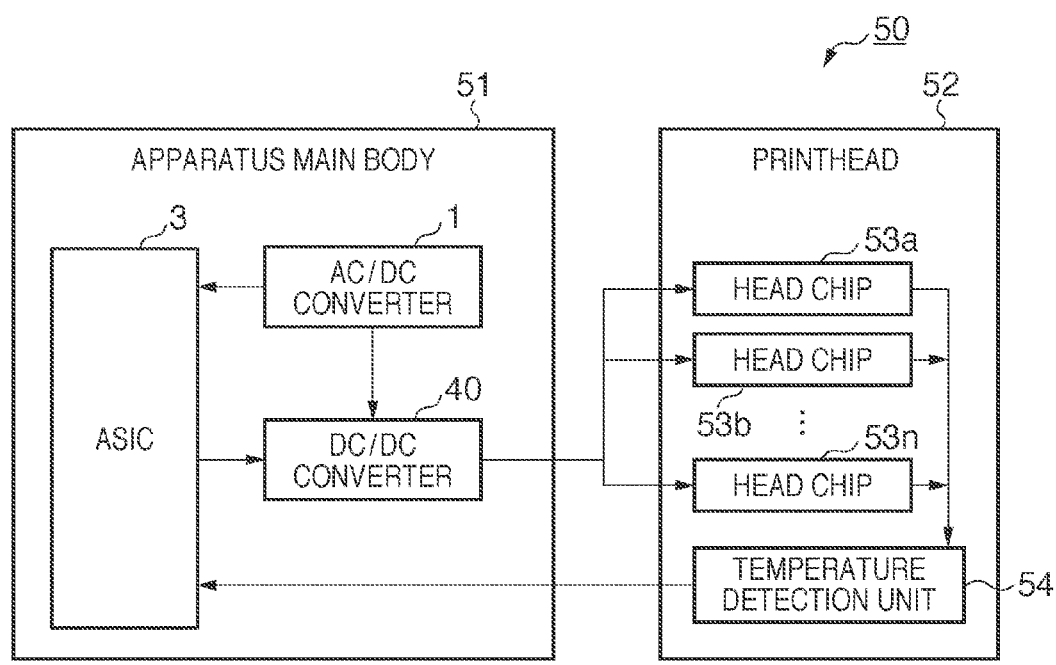
FIG. 4 is a schematic block diagram showing an example of the arrangement of a printing apparatus 50 according to the fourth embodiment.

FIG. 4 shows an example of a schematic arrangement of an ink-jet printing apparatus (to be referred to as a printing apparatus hereinafter) which prints an image by discharging inks according to an ink-jet method. Components denoted by the same reference numerals have the same functions as those of the components shown in FIG. 3 used to explain the third embodiment, and a description thereof will not be repeated.

Figure 2:
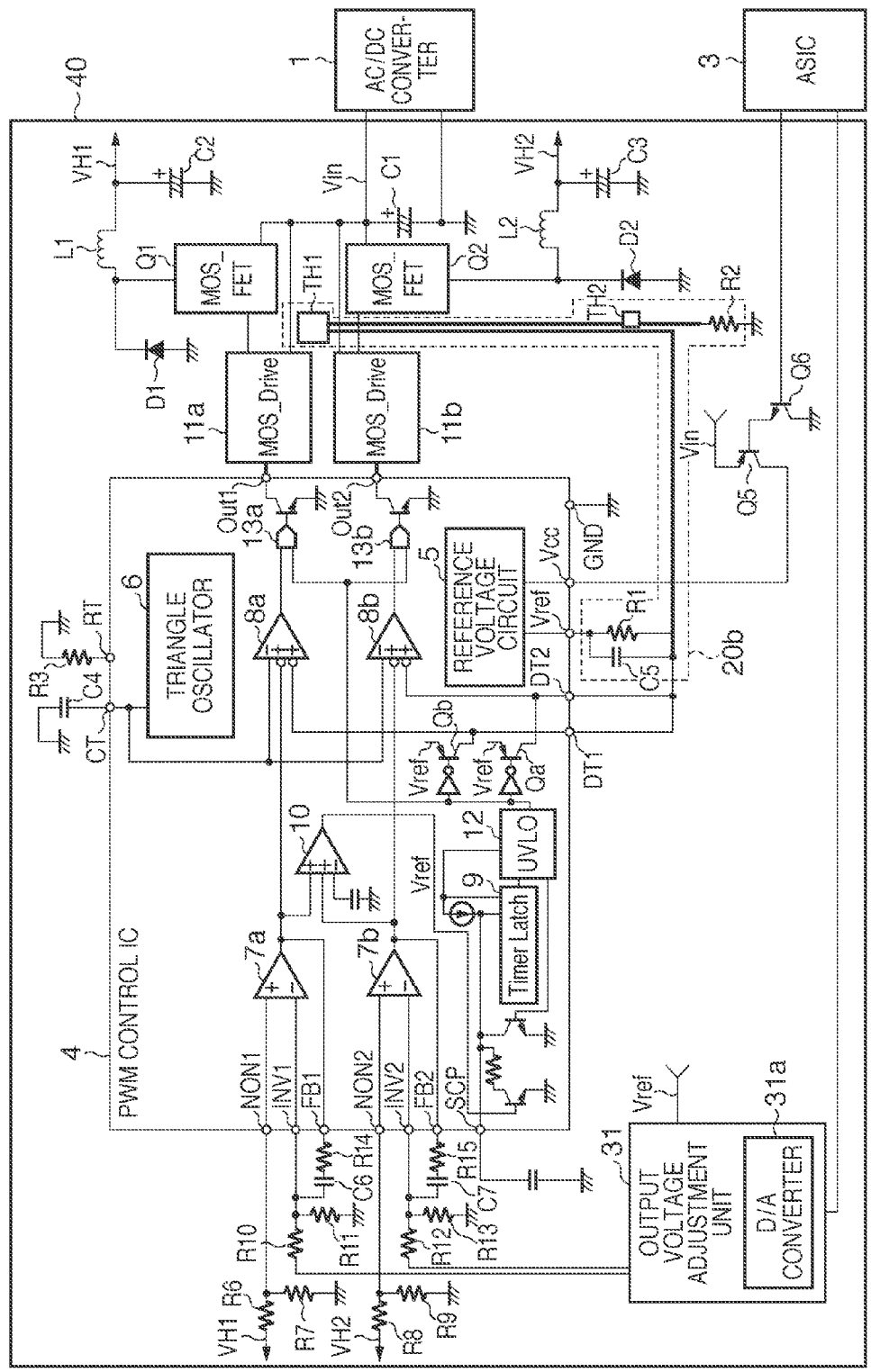
FIG. 2 is a schematic circuit diagram showing an example of the arrangement of a DC/DC converter 40 according to the second embodiment.

Note that the DC/DC converters 40 shown in FIGS. 1 and 2 used to explain the first and second embodiments are similarly applicable to the printing apparatus.

A printing apparatus 50 is configured to include an apparatus main body 51 which controls the overall printing apparatus 50, and a printhead 52 which is scanned relative to a printing medium (for example, a paper sheet). The printhead 52 includes head chips (printing element boards). In this case, the printhead 52 includes at least one of head chips 53a to 53n (in this case, N head chips). Each of the head chips 53a to 53n includes a plurality of printing element (nozzle) arrays. For example, when N=2, the printhead 52 includes the head chips 53a and 53b. The head chip 53a includes four printing element arrays, which are assigned to four colors. Likewise, the head chip 53b includes four printing element arrays.

The DC/DC converter 40 is ON/OFF-controlled by an external control signal (for example, from an ASIC 3 or CPU (not shown)). A voltage VH1 output from the DC/DC converter 40 is supplied to the head chip 53a, and a voltage VH2 output from the DC/DC converter 40 is supplied to the head chip 53b. The ASIC 3 transmits a control signal to, for example, an output voltage adjustment unit 31, thereby changing the output voltages supplied from the DC/DC converter 40 to the head chips 53a to 53n. Note that the ASIC 3 has a table which stores the relationship between head temperatures and output voltages, and that which stores the relationship between the output voltages and components to be overheat-detected in a memory (ROM) (not shown), and determines a control signal to be transmitted to the output voltage adjustment unit 31 and a switching unit 32.

The printing apparatus shown in FIG. 4 includes an N-output DC/DC converter 40. The ASIC 3 changes voltage values to be supplied from the DC/DC converter 40 to the head chips 53a to 53n based on temperature changes of the head chips 53a to 53n detected by a temperature detection unit 54. More specifically, the ASIC 3 changes voltage values of driving voltages (output voltages from the DC/DC converter 40) to be supplied with respect to a predetermined time interval or predetermined head temperature change based on the temperature changes of the head chips 53a to 53n.

As described above, according to the present invention, since a PTC thermistor can be added by a simple arrangement, an overheat state of a component to be overheat-protected (a component which overheats due to a decrease in output voltage) can be detected in a cost-suppressed state.

The representative embodiments of the present invention have been described. However, the present invention is not limited to the aforementioned and illustrated embodiments, and appropriate modifications of the present invention can be made without departing from the scope of the invention.

For example, the aforementioned embodiments have exemplified the MOS-FETs as switching elements. However, transistors of other types may be used as switching elements.

In the descriptions of the aforementioned embodiments, the MOS-Drive circuits are arranged outside the PWM control IC. However, the MOS-Drive circuits may be integrated with the PWM control IC.

The aforementioned embodiments have exemplified the case in which overheat states of the switching elements in the DC/DC converter and components other than the switching elements are detected. However, the present invention is not limited to this. For example, overheat states of switching elements or components other than the switching elements in a regulator mounted on a printing circuit board may be detected to stop the operation of the DC/DC converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-151432 filed on Jul. 1, 2010, which is hereby incorporated by reference herein in its entirety.

What is claimed is:

1. A voltage converter comprising:
   a switching element for controlling an output voltage of the voltage converter;
   a control unit configured to control the switching element based on a voltage signal; and
   a generation unit configured to generate the voltage signal by serially connecting a resistance element and a detection unit having a resistor corresponding to a temperature, wherein the generation unit includes a plurality of detecting units and a switching unit for selecting one of the plurality of detecting units,
   wherein the detection unit is arranged so as to be able to detect a temperature change of a plurality of components which is overheat-protected,
   the plurality of detecting units include a first detecting unit arranged close to the switching element and a second detecting unit arranged close to a rectification circuit, and
   the switching unit selects the first detecting unit in a case where the output voltage is a predetermined value or more, and selects the second detecting unit in a case where the output voltage is smaller than the predetermined value.

2. The converter according to claim 1, wherein said control unit controls a maximum value of a pulse width of a control signal from the control unit based on a voltage level of the voltage signal.

3. The converter according to claim 1, wherein the detection unit includes a thermistor, a resistance value of which increases as a temperature rises.

4. The converter according to claim 1, wherein said generation unit comprises the detection unit and an integration unit.

5. The converter according to claim 4, wherein the integration unit is configured by the resistance element and a capacitor.

6. The converter according to claim 1, wherein said switching element includes a transistor.

7. The converter according to claim 1, wherein a smoothing unit and a rectification unit are connected to said switching element, and the detection unit is thermally coupled to one of the smoothing unit and the rectification unit.

8. The converter according to claim 1, wherein
   said control unit is a 1-chip semiconductor circuit, and comprises a terminal configured to output a control signal, and a terminal configured to input the voltage signal.

9. The converter according to claim 1, wherein
   said control unit further comprises a unit configured to generate a reference voltage for generating the voltage signal, and a terminal configured to output the reference voltage.

10. An electronic apparatus comprising a voltage converter according to claim 1.

11. The apparatus according to claim 10, wherein said electronic apparatus is a printing apparatus comprising a printhead.

12. The converter according to claim 1, wherein
the generation unit is arranged between a ground node and an input terminal of the control unit.

13. The converter according to claim 12,
wherein the switching unit is arranged in a path connecting the ground node and the input terminal of the control unit.

14. The converter according to claim 1, wherein
the control unit generates a control signal based on the voltage signal, and turns on/off the switching element based on the control signal.

15. The converter according to claim 1, wherein
the generation unit generates the voltage signal by dividing a reference voltage by the detection unit and the resistance element.

* * * * *